(12) United States Patent
Heebner et al.

(10) Patent No.: US 10,293,345 B2
(45) Date of Patent: May 21, 2019

(54) COLLECTOR COMPOSITIONS AND METHODS OF USING THEREOF

(71) Applicant: Arizona Chemical Company, LLC, Jacksonville, FL (US)

(72) Inventors: Gerald W Heebner, Savannah, GA (US); Lloyd A Nelson, Savannah, GA (US)

(73) Assignee: Kraton Chemical, LLC, Jacksonville, FL (US)

( * ) Notice: Subject to any disclaimer, the term of this patent is extended or adjusted under 35 U.S.C. 154(b) by 213 days.

(21) Appl. No.: 15/291,741

(22) Filed: Oct. 12, 2016

(65) Prior Publication Data

US 2017/0128955 A1 May 11, 2017

Related U.S. Application Data

(60) Provisional application No. 62/240,094, filed on Oct. 12, 2015.

(51) Int. Cl.
*C01B 25/12* (2006.01)
*B03D 1/008* (2006.01)
*B03D 1/016* (2006.01)

(52) U.S. Cl.
CPC .............. *B03D 1/016* (2013.01); *B03D 1/008* (2013.01); *C01B 25/12* (2013.01); *B03D 2201/02* (2013.01); *B03D 2203/02* (2013.01); *B03D 2203/025* (2013.01); *B03D 2203/04* (2013.01)

(58) Field of Classification Search
CPC .................................................. B03D 1/008
See application file for complete search history.

(56) References Cited

U.S. PATENT DOCUMENTS

| | | | |
|---|---|---|---|
| 1,988,999 A | | 1/1935 | Cunningham et al. |
| 2,688,590 A | * | 9/1954 | Sisson ............... C11B 13/005 159/13.2 |
| 2,831,574 A | * | 4/1958 | Weinig ............... B03D 1/008 209/166 |
| 3,032,195 A | | 5/1962 | Fenske |
| 3,331,505 A | * | 7/1967 | Mercade ............ B03D 1/002 209/11 |
| 4,169,170 A | | 9/1979 | Doeksen |
| 4,189,103 A | | 2/1980 | Lawver et al. |
| 4,589,980 A | | 5/1986 | Keys |

(Continued)

OTHER PUBLICATIONS

Sis, H., et al. Reagents used in the flotation of phosphate ores: a critical review. Minerals Engineer 16 (2003) 577-585. DOI 10.1016/S0892-6875(03)00131-6.

*Primary Examiner* — Melissa S Swain

(57) ABSTRACT

A collector composition comprising (a) refined tall oil wherein the refined tall oil is any tall oil that has been subjected to one or more refining or processing steps that results in an increase in acid value; and (b) a fatty acid wherein the refined tall oil has an acid value of at least 90 mg KOH/g and a weight average molecular weight of at least 750 g/mol. A mineral slurry comprising (a) an ore comprising a mineral of interest; (b) a collector composition comprising (i) a refined tall oil; and (ii) a fatty acid; and (c) a liquid. A method for the beneficiation of an ore, the method comprising (a) preparing a slurry comprising the ore dispersed in a liquid; (b) contacting the slurry with a collector composition comprising a refined tall oil; and (c) recovering a beneficiated ore.

17 Claims, 3 Drawing Sheets

(56) References Cited

U.S. PATENT DOCUMENTS

| | | |
|---|---|---|
| 5,147,528 A | 9/1992 | Bulatovic |
| 8,133,970 B2 | 3/2012 | Hurd et al. |
| 8,231,008 B2 | 7/2012 | Patterson et al. |
| 8,403,146 B2 | 3/2013 | Hurd et al. |
| 8,425,781 B2 | 4/2013 | Hines et al. |
| 8,505,736 B1 | 8/2013 | Friel et al. |
| 8,735,637 B2 | 5/2014 | Stigsson et al. |
| 8,875,898 B2 | 11/2014 | Hines et al. |
| 8,925,729 B2 | 1/2015 | Hines et al. |
| 2013/0168594 A1 | 7/2013 | Hurd et al. |

* cited by examiner

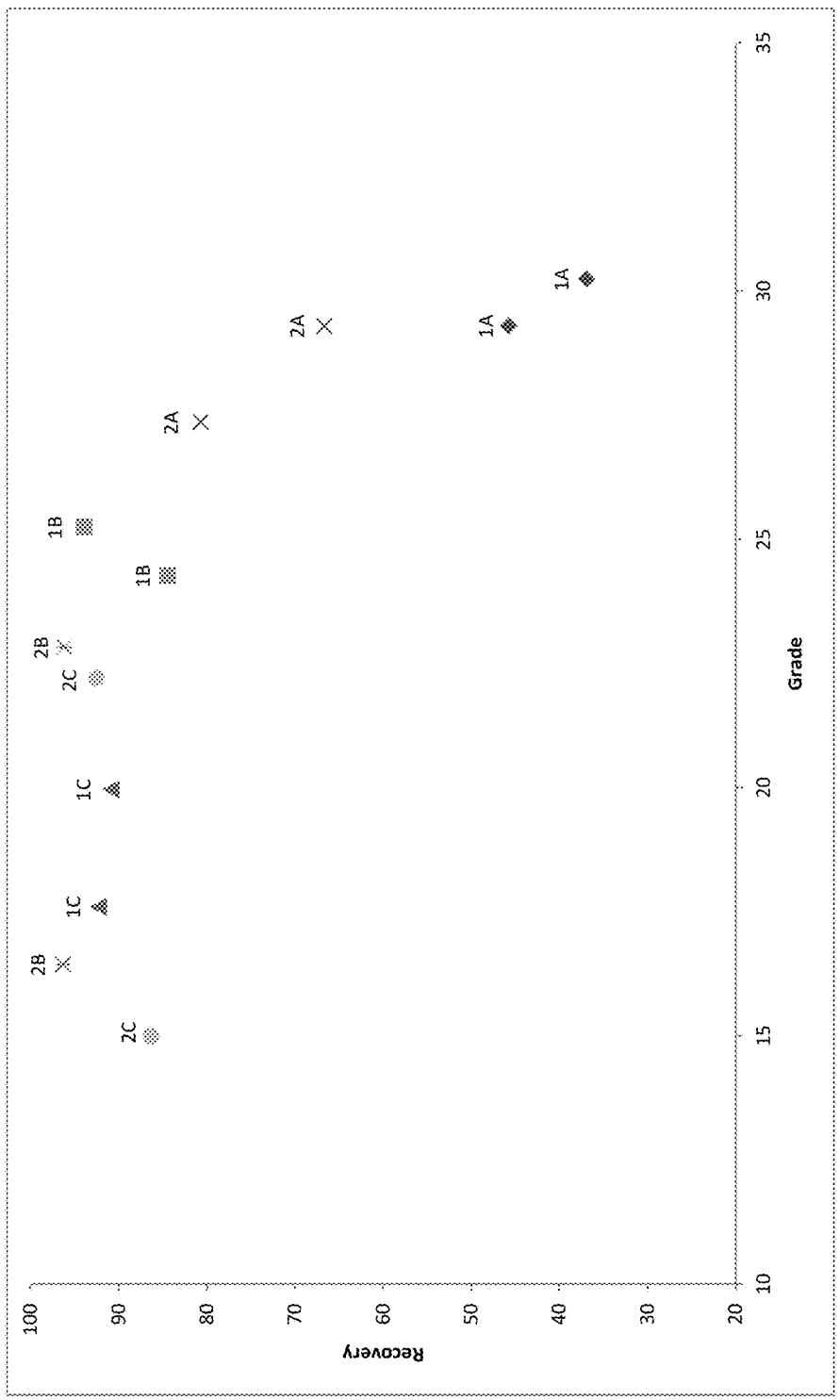

COLLECTOR COMPOSITIONS AND METHODS OF USING THEREOF

CROSS-REFERENCE TO RELATED APPLICATIONS

The present application is a non-provisional of and claims priority to U.S. Provisional Patent Application No. 62/240,094 filed Oct. 12, 2015 and entitled "Collector Compositions and Methods of Using Thereof," which application is incorporated by reference herein in its entirety.

TECHNICAL FIELD

This application relates generally to the processing of ore into minerals and gangue. This disclosure also relates to collectors used in froth flotation, and methods of using the collectors in froth flotation.

BACKGROUND

Froth flotation is used for beneficiating ores. In particular, froth flotation can be used to separate valuable minerals in an ore from their associated gangue, or for separating the valuable minerals from one another. Froth flotation typically involves mixing an aqueous slurry containing finely ground ore particles with a frothing or foaming agent to produce a froth. Ideally, ore particles that contain the desired mineral are preferentially attracted to the froth because of an affinity between the froth and the exposed mineral on the surfaces of the ore particles. The resulting beneficiated minerals are then collected by separating them from the froth. The ability of a mineral to float is related to its surface properties. Chemical reagents known as "collectors" are used to modify surface properties of minerals, and may be added to the slurry to increase the selectivity and efficiency of the separation process.

Because of the large scale on which mining operations are typically conducted and the large difference in value between the desired mineral and the associated gangue, even relatively small increases in separation efficiency provide substantial gains in productivity. Accordingly, there is a significant need for improved collectors for use in flotation processes.

SUMMARY

Disclosed herein are collector compositions comprising (a) refined tall oil wherein the refined tall oil is any tall oil that has been subjected to one or more refining or processing steps that results in an increase in acid value; and (b) a fatty acid wherein the refined tall oil has an acid value of at least 90 mg KOH/g and a weight average molecular weight of at least 750 g/mol.

Also disclosed herein is a mineral slurry comprising (a) an ore comprising a mineral of interest; (b) a collector composition comprising (i) a refined tall oil; and (ii) a fatty acid; and (c) a liquid.

Also disclosed herein is a method for the beneficiation of an ore, the method comprising (a) preparing a slurry comprising the ore dispersed in a liquid; (b) contacting the slurry with a collector composition comprising a refined tall oil; and (c) recovering a beneficiated ore.

BRIEF DESCRIPTION OF THE DRAWINGS

FIG. 3 is a graph of Recovery (% $P_2O_5$) versus Grade (% $P_2O_5$).

DETAILED DESCRIPTION

Figure 1:
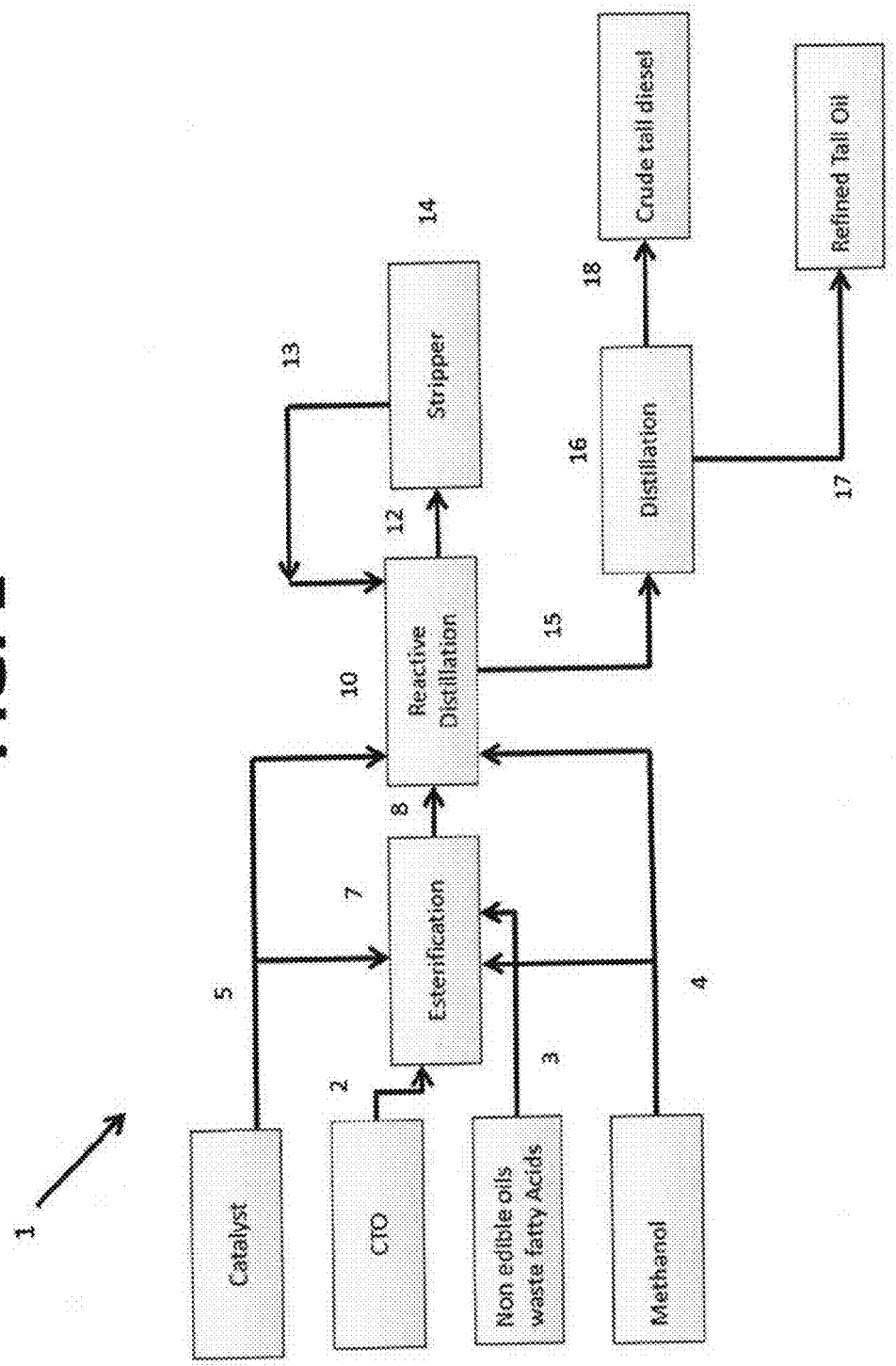
FIG. 1 is a graph of the sample recovery as a function of grade for the samples from Example 1 using standard tall oil pitch.
Figure 2:
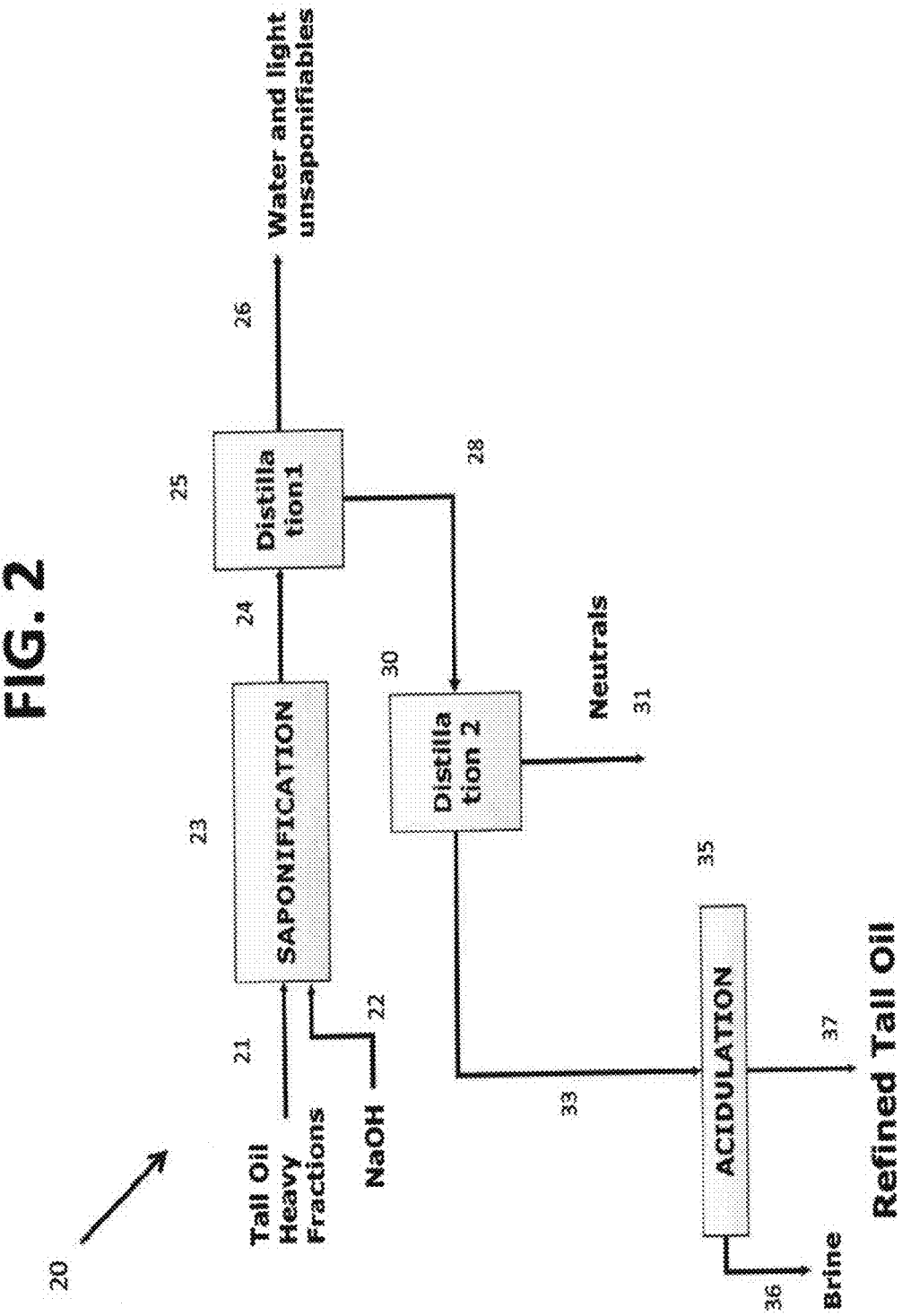
FIG. 2 is a graph of the sample recovery as a function of grade for the samples from Example 1 using refined tall oil.

Provided herein are collector compositions that can be used in conjunction with processes for beneficiating ores, including froth flotation processes. The collector compositions include a refined plant based oil, such as refined tall oil. The refined tall oil can be any tall oil that has been subjected to one or more subsequent refining or processing steps that result in an increase in acid value.

Tall oil is a by-product of the sulfate (kraft) pulping process wherein coniferous woods, such as pine, are cooked using sodium sulfide-sulfate-alkaline cooking liquors. As a result of the cooking procedure, a "soap" is formed that comprises a mixture of saponified fatty and resin acids and unsaponifiables which are then recovered from the spent cooking liquor as "skimmings". The skimmings are acidified and recovered as so-called "crude tall oil". The processes for the formation of crude tall oil from the sulfate pulping process are described for example in U.S. Pat. Nos. 2,854,334 and 4,507,172, the entire subject matter of which are incorporated herein by reference.

The phrase "refined tall oil" refers to a material prepared from the treatment (e.g., distillation, reaction, or separation) of crude tall oil or from the treatment of distilled fractions thereof. In one aspect, the refined tall oil is a product of fractions that are produced during the distillation, reaction or separation of crude tall oil. In another aspect, the refined tall oil is prepared from treating (e.g., distillation, reaction, or separation) heavier fractions (higher boiling point liquids) obtained by distilling crude tall oil. The distillation, reaction or separation conditions may be maintained such that the refined tall oil is higher in acid value. The refined tall oil stream may be used as is in ore flotation or further refined to remove rosin and then used in ore flotation.

In one aspect, the refined tall oil can be produced from any tall oil heavier fractions that have been subjected to one or more subsequent refining or processing steps that result in an increase in acid value. Examples of such refining or processing steps include, for example, saponification, extraction (e.g., solvent extraction), distillation, crystallization, filtration, centrifugation, or a combination thereof.

The refined tall oil can comprise a mixture of fatty acids, rosin acids, and fatty acid esters. In some cases, the refined tall oil can comprise at least 5% by weight (e.g., at least 10% by weight, at least 20% by weight, at least 30% by weight, at least 40% by weight, at least 45% by weight, at least 50% by weight, or at least 55% by weight) fatty acids, rosin acids, and fatty acid esters as measured by gas chromatography-mass spectrometry (GC-MS), based on the total weight of the refined tall oil. In some cases, the refined tall oil can comprise 60% by weight or less (e.g., 55% by weight or less, 50% by weight or less, or 45% by weight or less) fatty acids, rosin acids, and fatty acid esters, based on the total weight of the refined tall oil.

The refined tall oil can comprise a mixture of fatty acids, rosin acids, and fatty acid esters in an amount ranging from any of the minimum values above to any of the maximum values above. For example, the refined tall oil can comprise from 35% to 100% by weight (e.g., from 40% to 99% by weight, from 40% to 98% by weight, from 40% to 97% by weight, from 40% to 95% by weight, or from 40% to 90% by weight) fatty acids, rosin acids, and fatty acid esters, based on the total weight of the refined tall oil. In one aspect, the refined tall oil can comprise from 45% to 90% by weight fatty acids, rosin acids, fatty acid esters, and rosin esters based on the total weight of the refined tall oil. In another aspect, the amount of fatty acids in the refined tall oil may range from 10% to 60%, or 15% to 50%, or 20% to 40% by weight based upon the total weight of the refined tall oil. In an even further aspect, the amount of rosin acids in the refined tall oil may range from 1% to 30%, or 3% to 25%, or 5% to 20% by weight based upon the total weight of the refined tall oil.

The refined tall oil can have an acid value that is high (e.g., above 80 mg KOH/g). In some aspects, the refined tall oil can have an acid value, as determined according to the method described in ASTM D465-05 (2010), of at least 90 mg KOH/g (e.g., at least 95 mg KOH/g, at least 100 mg KOH/g, at least 105 mg KOH/g, at least 110 mg KOH/g, at least 115 mg KOH/g, at least 120 mg KOH/g, at least 125 mg KOH/g, at least 130 mg KOH/g, at least 135 mg KOH/g, at least 140 mg KOH/g, or at least 145 mg KOH/g). In some aspects, the refined tall oil can have an acid value of 150 mg KOH/g or less (e.g., 145 mg KOH/g or less, 140 mg KOH/g or less, 135 mg KOH/g or less, 130 mg KOH/g or less, 125 mg KOH/g or less, 120 mg KOH/g or less, 115 mg KOH/g or less, 110 mg KOH/g or less, 105 mg KOH/g or less, 100 mg KOH/g or less, or 95 mg KOH/g or less).

The refined tall oil can have an acid value ranging from any of the minimum values above to any of the maximum values above. For example, the refined tall oil can have an acid value of from 90 mg KOH/g to 150 mg KOH/g (e.g., from 100 mg KOH/g to 150 mg KOH/g, from 100 mg KOH/g to 140 mg KOH/g, from 110 mg KOH/g to 150 mg KOH/g, from 110 mg KOH/g to 140 mg KOH/g, from 120 mg KOH/g to 150 mg KOH/g, or from 120 mg KOH/g to 140 mg KOH/g).

In some aspects, the refined tall oil can have a saponification value, as determined according to the method described in ASTM D464-05 (2010), of at least 115 mg KOH/g (e.g., at least 120 mg KOH/g, at least 125 mg KOH/g, at least 130 mg KOH/g, at least 135 mg KOH/g, at least 140 mg KOH/g, at least 145 mg KOH/g, at least 150 mg KOH/g, or at least 155 mg KOH/g). In some aspects, the refined tall oil can have a saponification value of 160 mg KOH/g or less (e.g., 155 mg KOH/g or less, 150 mg KOH/g or less, 145 mg KOH/g or less, 140 mg KOH/g or less, 135 mg KOH/g or less, 130 mg KOH/g or less, 125 mg KOH/g or less, or 120 mg KOH/g or less).

The refined tall oil can have a saponification value ranging from any of the minimum values above to any of the maximum values above. For example, the refined tall oil can have a saponification value of from 115 mg KOH/g to 160 mg KOH/g (e.g., from 120 mg KOH/g to 160 mg KOH/g, from 130 mg KOH/g to 160 mg KOH/g, from 135 mg KOH/g to 155 mg KOH/g, or from 140 mg KOH/g to 150 mg KOH/g).

In some aspects, the fatty acids in the refined tall oil include oleic acid, linoleic acid, linolenic acid, stearic acid, pinolenic acid, palmitic acid, eicosenoic acid, eicosatrienoic acid, etc., and isomers thereof (e.g., C16, C17, C18, C19, and C20 fatty acids, and their isomers, as well as lower and higher carbon number fatty acids).

In some aspects, the refined tall oil comprises linoleic acid. The refined tall oil can comprise at least 3% by weight (e.g., at least 3.5% by weight, at least 4% by weight, at least 4.5% by weight, at least 5% by weight, at least 5.5% by weight, or at least 6% by weight) linoleic acid as measured by GC-MS, based on the total weight of the refined tall oil. The refined tall oil can comprise 6.5% by weight or less (e.g., 6% by weight or less, 5.5% by weight or less, 5% by weight or less, 4.5% by weight or less, 4% by weight or less, or 3.5% by weight or less) linoleic acid, based on the total weight of the refined tall oil.

The refined tall oil can comprise an amount of linoleic acid ranging from any of the minimum values above to any of the maximum values above. For example, the refined tall oil can comprise from 3% to 6.5% by weight (e.g., from 4.5% to 6.5% by weight, or from 5% to 6% by weight) linoleic acid, based on the total weight of the refined tall oil.

In some aspects, the refined tall oil comprises oleic acid. The refined tall oil can comprise at least 6.5% by weight (e.g., at least 7% by weight, at least 7.5% by weight, at least 8% by weight, at least 8.5% by weight, at least 9% by weight, at least 9.5% by weight, at least 10% by weight, at least 10.5% by weight, at least 11% by weight, or at least 11.5% by weight) oleic acid as measured by GC-MS, based on the total weight of the refined tall oil. The refined tall oil can comprise 12% by weight or less (e.g., 11.5% by weight or less, 11% by weight or less, 10.5% by weight or less, 10% by weight or less, 9.5% by weight or less, 9% by weight or less, 8.5% by weight or less, 8% by weight or less, 7.5% by weight or less, or 7% by weight or less) oleic acid, based on the total weight of the refined tall oil.

The refined tall oil can comprise an amount of oleic acid ranging from any of the minimum values above to any of the maximum values above. For example, the refined tall oil can comprise from 6.5% to 12% by weight (e.g., from 7% to 12% by weight, from 8.5% to 10.5% by weight, or from 9% to 10% by weight) oleic acid, based on the total weight of the refined tall oil.

In some aspects, the refined tall oil can comprise palmitic acid. The refined tall oil can comprise at least 1% by weight (e.g., at least 1.5% by weight, at least 2% by weight, at least 2.5% by weight, at least 3% by weight) palmitic acid as measured by GC-MS, based on the total weight of the refined tall oil. The refined tall oil can comprise 4.5% by weight or less (e.g., 3% by weight or less, 2.5% by weight or less, 2% by weight or less, or 1.5% by weight or less) palmitic acid, based on the total weight of the refined tall oil.

The refined tall oil can comprise an amount of palmitic acid ranging from any of the minimum values above to any of the maximum values above. For example, the refined tall oil can comprise from 1% to 3% by weight (e.g., from 1.5% to 3.0% by weight, or from 2.5% to 3.0% by weight) palmitic acid, based on the total weight of the refined tall oil.

In some aspects, the refined tall oil can comprise linoleic acid and oleic acid. For example, the refined tall oil can comprise at least 4.5% by weight linoleic acid and at least 7.5% by weight oleic acid (e.g., at least 5% by weight linoleic acid and at least 9% by weight oleic acid) as measured by GC-MS, based on the total weight of the refined tall oil. In some aspects, the refined tall oil can also comprise palmitic acid. For example, the refined tall oil can also comprise at least 1% by weight palmitic acid (e.g., at least 2% by weight palmitic acid) as measured by GC-MS, based on the total weight of the refined tall oil.

In one aspect, the refined tall oil comprises from 4.5% to 6.5% by weight (e.g., from 5% to 6% by weight) linoleic acid, from 8.5% to 10.5% by weight (e.g., from 9% to 10% by weight) oleic acid, and from 1.5% to 3.5% by weight (e.g., from 2.5% to 3.5% by weight) palmitic acid as measured by GC-MS, based on the total weight of the refined tall oil. The remaining fatty acids, such as alkylated aromatic, and dimerized fatty acids, may be present in the refined tall oil in an amount of 1% to 5% by weight, based upon the total weight of the refined tall oil.

In some aspects, the refined tall oil has an ester content of less than 30% by weight (e.g., less than 25% by weight, less than 20% by weight, less than 15% by weight, or less than 10% by weight) as measured by GC-MS, based on the total weight of the refined tall oil. In some aspects, the refined tall oil has an ester content of at least 5% by weight, based on the total weight of the refined tall oil. The ester content of the refined tall oil may include both TOFA esters and rosin esters, and additionally wax esters and sterol esters.

In some aspects, the refined tall oil has an ester content of from 5% to 30% by weight (e.g., from 5% to 20% by weight, from 5% to 15% by weight, or from 5% to 10% by weight) as measured by GC-MS, based on the total weight of the refined tall oil.

In some aspects, the refined tall oil has a polymeric acid content of at least 20% by weight (e.g., at least 25% by weight, at least 30% by weight, at least 35% by weight, at least 40% by weight, or at least 45% by weight) as measured by GC-MS, based on the total weight of the refined tall oil. In some aspects, the refined tall oil has a polymeric acid content of 50% by weight or less, based on the total weight of the refined tall oil. In one aspect, the refined tall oil includes polymeric acids composed of fatty acids, including alkylated aromatics, dimerized fatty acids, trimerized fatty acids, dimerized aromatic acids, and the like.

In some aspects, the refined tall oil has a polymeric acid content of from 20% to 50% by weight (e.g., from 35% to 50% by weight, or from 40% to 50% by weight) as measured by GC-MS, based on the total weight of the refined tall oil.

In other aspects, the refined tall oil further comprises high molecular weight hydrocarbons, such as decarboxylated alkylated aromatics, dimer and trimer acids, and the like, in an amount of 5% to 10% by weight based upon the total weight of the refined tall oil; and sterols in an amount of 0.1% to 5% by weight based upon the total weight of the refined tall oil.

The refined tall oil can have a weight average molecular weight, as determined using gel permeation chromatography (GPC) as described in ASTM D5296-05, of at least 750 g/mol (e.g., at least 800 g/mol, at least 850 g/mol, at least 900 g/mol, at least 950 g/mol, at least 1000 g/mol, at least 1050 g/mol, at least 1100 g/mol, at least 1150 g/mol, at least 1200 g/mol, or at least 1250 g/mol). The refined tall oil can have a weight average molecular weight of 1300 g/mol or less (e.g., 1250 g/mol or less, 1200 g/mol or less, 1150 g/mol or less, 1100 g/mol or less, 1050 g/mol or less, 1000 g/mol or less, 950 g/mol or less, 900 g/mol or less, 850 g/mol or less, or 800 g/mol or less)

The refined tall oil can have a weight average molecular weight ranging from any of the minimum values above to any of the maximum values above. For example, the refined tall oil can have a weight average molecular weight of from 750 g/mol to 1300 g/mol (e.g., from 900 g/mol to 1300 g/mol, or from 950 g/mol to 1150 g/mol).

The refined tall oil can be present in the collector compositions in an amount ranging from 1% to 100% by weight (e.g., from 5% to 50% by weight), based on the total weight of the collector composition.

Collector compositions can further include a fatty acid, such as a tall oil fatty acid (TOFA). As used herein, "tall oil fatty acid" or "TOFA", consistent with industry standards, encompasses compositions which include not only fatty acids, but also rosin acids and/or unsaponifiables. In some aspects, the fatty acid can comprise from 85% to 100% by weight (e.g., from 91% to 98% by weight) fatty acids, with the remainder (e.g. 0 to 15%) being rosin acids and unsaponifiables, as measured by GC-MS, based on the total weight of the fatty acid. TOFAs are generally produced as a distillation fraction of crude tall oil and therefore contain saturated and unsaturated fatty acids, rosin acids, and mixtures thereof. Suitable fatty acids are commercially available, for example, from Arizona Chemical under the trade name SYLFAT (e.g., SYLFAT™ FA-1, SYLFAT™ FA-2, SYLFAT™ 2, SYLFAT™ 2LTC, and SYLFAT™ 2LT).

In other aspects, the collector compositions may further include TOFA derivatives (i.e., TOFA reacted with functional groups), such as esters, amines, sulfides, sulfonates, etc. and mixtures thereof. Other components in the collector composition include crude tall oil, distilled tall oil, plant oils, animal oils, algal derived oils, microbially derived oils, and mixtures thereof. Non-limiting examples of plant- and animal-based oils include: canola oil; castor oil; coco butter; coconut oil; corn oil; cotton seed oil; crambe oil; linseed oil; olive oil; palm kernel oil; palm oil; peanut oil; rape seed oil; safflower oil; soybean oil; sunflower seed oil; tall oil; tung oil; butter; lard; tallow; yellow grease; and fish oil (e.g., herring oil, menhaden oil, and sardine oil). The composition may include mixtures of any of these oils and any of their corresponding fatty acids, and derivatives thereof (i.e., oils or their fatty acids reacted with functional groups) such as esters, amines, sulfides, sulfonates, etc. and mixtures thereof. In other aspects, hydrocarbon materials and mixtures thereof may also be included in the collector composition. Examples of hydrocarbon materials include fuel oils, solvents, terpenes, and mixtures thereof. In another aspect, the collector composition may include any other fractions created by distillation or refining of the above-mentioned oils and their fatty acids, and any products or by-products created during the purification of the above-mentioned oils or their fatty acids, such as soap stock residuals created during the purification of oils.

In some aspects, the refined tall oil can have an acid value, as determined according to the method described in ASTM D465-05 (2010), of from 190 mg KOH/g to 200 mg KOH/g. In an aspect, the fatty acid comprises a $C_{18}$ fatty acid. In some aspects, the fatty acid comprises oleic acid, linoleic acid, linolenic acid, or combinations thereof.

When present in the collector compositions, the fatty acid can be present in the collector compositions in an amount ranging from 5% to 100% by weight (e.g., from 25% to 60% by weight, from 30% to 60% by weight, or from 30% to 50% by weight), based on the total weight of the collector composition.

Optionally, collector compositions can further include one or more additional components, such as frothing agents, depressants, additional collectors, activators, modifiers, or a combination thereof, which may be present in the collector composition in an amount of up to 20% by weight, based upon the total weight of the collector composition.

Frothing agents are compounds that can be used to lower the interfacial tension of an aqueous slurry with air and control the size of the air bubbles formed during a froth flotation process. Frothing agents can increase the strength and stability of the surface froth, thus improving the ability of the surface froth to support the mineral particles that float until they are removed from the system. Non-limiting examples of frothing agents include pine oil, methyl isobutyl carbitol (MIBC) and other alcohols of similar molecular weight, glycols and polyglycols, glycol and polyglycol ethers of aliphatic alcohols such as cyclohexanol.

Depressants are compounds that can be used to decrease or prevent the entry of undesired minerals into a froth by precipitating deleterious ions that could interfere with collection or by coating selected minerals to decrease or prevent collector attachment. Non-limiting examples of depressants include urea formaldehyde polymers and oligomers. See, for example, U.S. Patent Application Publication Nos. 2008/0029460; 2008/0017552; 2007/0012630; 2007/0000839; 2006/0151397; and 2006/0151360. Further examples of depressants include: cyanide salts; sodium sulphide/hydrosulphide; sulphites; waterglass; polysaccharides such as starch, chemically modified polysaccharides like carboxymethylcellulose (CMC); natural gums like guar gum, agar, alginic acid, glucan, carrageenan, chicle gum, gellan gum, glucomannan, gum arabic, locust bean gum, psyllium seed husks, alginates, spruce gum, tara gum, and xanthan gum; and chemically modified natural gums.

Additional collectors can be, for example, ionic collectors and/or nonionic collectors. Ionic collectors can be anionic collectors (e.g., xanthates, thiophosphates, organic sulfides, carboxylic collectors, and sulfoxy collectors), cationic collectors (e.g., amines and amine salts), and/or amphoteric collectors. Nonionic collectors can be nonpolar collectors and/or heteropolar collectors. In some aspects, an additional collector can be chosen from amines, fatty acids, fuel oil, kerosene, petroleum sulfonate (e.g., lignin), thionocarbamates (e.g., ethyl isopropyl thionocarbamate and methyl butyl thionocarbamates), xanthates (e.g., isopropyl xanthate, amyl xanthate, butyl xanthate, and ethyl xanthate), tall oil, thiophosphates (e.g., dicresyl thiophosphate, di-sec-butyl thiophosphate, diamyl thiophosphate, and diethyl thiophosphate), oleic acid, xanthogen formate, sodium dodecyl sulfate, and mercaptans (e.g., dodecyl mercaptan).

Activators are compounds that can be used to promote coating of the collector onto the desired mineral. Examples of activators include inorganic commodity chemicals, such as copper ions (e.g., sulfates and chloride), aluminum salts (e.g., nitrates and sulfates), sodium sulfide, silicates (e.g., sodium and potassium), carbonates (e.g., sodium), hydroxides (e.g., sodium and calcium), lead acetate, and sodium hydrosulfide.

Modifiers are compounds that can be used to increase the selectivity of a collector. Non-limiting examples of modifiers include: lime, soda ash, alum, ammonia, caustic soda, phosphates, sodium silicate, sulfur dioxide, lignosulfonate, cationic modifiers (e.g., $Ba^{2+}$, $Ca^{2+}$, $Cu^+$, $Pb^{2+}$, $Zn^{2+}$, and $Ag^+$), anionic modifiers (e.g., $SiO_3^{2-}$, $PO_4^{3-}$, $CN^-$, $CO_3^{2-}$, and $S^{2-}$), organic modifiers (e.g., dextrin, starch, glue, and carboxymethylcellulose), sulfuric acid, and hydrochloric acid. In some aspects, a modifier can be selected to alter the pH of an aqueous slurry. In some aspects, a modifier can be selected to increase the pH of an aqueous slurry. For example, the modifier can be selected to increase the pH of an aqueous slurry to a pH ranging from about 9 to about 12. In some aspects, a modifier can be selected to decrease the pH of an aqueous slurry. For example, the modifier can be selected to decrease the pH of an aqueous slurry to a pH ranging from about 2 to about 3.

The collector compositions as described herein can be used in similar froth flotation applications as conventional fatty acid collectors. For example, the collector compositions described herein can be used to float iron, phosphate, barite, fluorite, feldspar, potash, fluorspar, magnesite, scheelite, celestite, anglesite, alunite, bauxite, gypsum, kainite, biotite, calcite, dolomite, albite, orthoclase, microcline, anhydrite, columbite, tantalite, pyrochlore, apatite, cassiterite, wolframite, rutile, ilmenite, hematite, and kaolin; noble metals, such as ruthenium, rhodium, palladium, silver, osmium, iridium, platinum, gold, mercury, rhenium and copper; refractory metals, such as niobium, molybdenum, tantalum, and tungsten, titanium, vanadium, chromium, zirconium, hafnium, osmium and iridium; rare earth metals, such as cerium, dysprosium, erbium, europium, gadolinium, holmium, lanthanum, lutetium, neodymium, praseodymium, promethium, samarium, scandium, terbium, thulium, ytterbium and yttrium; and mixtures thereof. In some aspects, the mineral can be phosphate or potash. In some aspects, the mineral can be phosphate. In some aspects, the mineral can be potash.

Accordingly, also provided are methods for the beneficiation of ore using the collector compositions described herein. For example, provided herein are methods of froth flotation comprising floating a mineral using the collector compositions described herein as froth flotation collectors. In some aspects, the method comprises floating a mineral using a collector composition comprising a refined tall oil in a froth flotation process. In some cases, methods can comprise providing a slurry comprising an ore dispersed in a liquid; contacting the slurry with a collector composition comprising a refined tall oil (e.g., a collector composition described herein); and recovering a beneficiated ore.

The beneficiated ore can comprise a mineral of interest such as, for example, iron phosphate, barite, fluorite, feldspar, potash, fluorspar, magnesite, scheelite, celestite, anglesite, alunite, bauxite, gypsum, kainite, biotite, calcite, dolomite, albite, orthoclase, microcline, anhydrite, columbite, tantalite, pyrochlore, apatite, cassiterite, wolframite, rutile, ilmenite, hematite, or kaolin; noble metals, such as comprises ruthenium, rhodium, palladium, silver, osmium, iridium, platinum, gold, mercury, and copper; refractory metals, such as niobium, molybdenum, tantalum, tungsten and rhenium, titanium, vanadium, chromium, zirconium, hafnium, osmium and iridium; rare earth metals, such as cerium, dysprosium, erbium, europium, gadolinium, holmium, lanthanum, lutetium, neodymium, praseodymium, promethium, samarium, scandium, terbium, thulium, ytterbium and yttrium; and mixtures thereof. In some cases, the mineral of interest is phosphate. In some cases, the mineral of interest is potash. In some cases, the mineral of interest is iron.

Depending on the ore and its condition, collector compositions can be used in an amount ranging from about 0.04 lb per ton of ore to about 10 lb per ton or ore. In some aspects, collector compositions can be used in an amount ranging from about 0.3 lb per ton of ore to about 0.9 lb per ton of ore.

Any suitable froth flotation cell and method of operation of a froth flotation cell can be used with the collector compositions as described herein. In some aspects, the froth flotation is an anionic or cationic flotation (i.e., the collector is anionic or the collector is cationic in use where the anionic collector is used to attach to cationic sites on the targeted species to be floated, or where the cationic collector is used to attach to the anionic sites on the targeted species to be floated). In some aspects, an initial anionic flotation is followed by a cationic flotation. For example, the refined tall oil of the present disclosure may be reacted with an amine and then form an amine salt, which may be used as a cationic collector; or the refined tall oil of the present disclosure may be used without modification as an anionic collector.

In a further aspect, the disclosure may be used in both direct flotation processes where the targeted mineral for concentration is floated with use of the collector and indirect or reverse flotation processes where the targeted mineral for concentration is depressed and the contaminant or undesirable species are floated with use of the collector. In both of these aspects (i.e., direct or reverse), the target material that is floated is separated using an anionic collector according to the present disclosure.

In some aspects, a froth flotation process for beneficiating an ore can include the steps of: (a) forming a slurry comprising water and particles of an ore; (b) intermixing the slurry with a collector composition as described herein; and (c) collecting the beneficiated ore. In some aspects, the slurry can be an aqueous slurry. In some aspects, the froth flotation process can further include intermixing the slurry with a frothing agent. In some aspects, the froth flotation process can further include intermixing the slurry with a depressant. In some aspects, the frothing agent and/or the depressant are combined with the collector composition prior to intermixing with the slurry. In some aspects, the collector composition, frothing agent, and/or depressant are intermixed with the slurry individually.

Also provided is a process of separating particles of a first material from a second material in an aqueous slurry. Such a process can include the steps of (a) adding a collector composition to an aqueous slurry of the materials; (b) providing air bubbles in the aqueous slurry to form bubble-particle aggregates, each of the bubble-particle aggregates having at least one of the air bubbles and at least one of the particles of the first material; and (c) allowing the bubble-particle aggregates to float in the aqueous slurry. In some aspects, the bubble-particle aggregates further include at least one compound of a collector composition. In some aspects, the slurry is agitated following addition of the collector composition. In some aspects, the first material is hydrophobic and the second material is hydrophilic. In some aspects, the collector composition increases the hydrophobicity of one of the materials.

Also provided is a process for floating a phosphate mineral. In some aspects, the phosphate mineral can be separated from a mineral mixture. In some aspects, the phosphate can be separated from carbonate (e.g., dolomite). In some aspects, the phosphate can be separated from dolomite, calcite, quartz, and silicates. In some aspects, the collector composition can be selective for phosphate. In some aspects, an ore slurry comprising phosphate can be subjected to a desliming step prior to froth flotation. In some aspects, a collector composition as described herein can be used to separate phosphate from the slime fraction.

Also provided is a method of separating a mineral from gangues. The method can comprising adding a collector composition described herein to a slurry of mineral and gangue, and separating the mineral from the gangue. In some aspects, the collector composition can facilitate the separation of the mineral from the gangue. Without being bound by theory, in some aspects the residual tall oil present in the collector composition functions as a collector.

In certain aspects of the methods described herein, the collector compositions can be used in conjunction with one or more additional components. The one or more additional components can be blended with the collector compositions (as described above), and/or added separately during the practice of the flotation methods described herein. In some cases, the collector compositions can be blended with and/or added in combination with:

(1) an alkylsulphosuccinate to float biotite, calcite, dolomite, magnesite, iron oxides, rutile, and ilmenite;
(2) with an alkyl sulfate to float celestite, gypsum, kainite, anglesite, bauxite, barite, alunite, fluorspar, and anhydrite;
(3) a mono or diphosphoric acid ester to float biotite, iron oxides, fluorspar, and titanium minerals;
(4) an oxidized petroleum product to float alunite;
(5) a non-ionic surfactant, such as an alkoxylated alkylphenol, to float coal, feldspar, apatite, and sulfur;
(6) crude tall oil, crude tall oil distillation fractions, and mixtures thereof to float coal, feldspar, apatite, and sulfur;
(7) alkoxylated alkylphenol formaldehyde condensates to float coal, feldspar, apatite, and sulfur;
(8) a succinic acid ester, succinic acid half ester, and mixtures thereof to float fluorspar and apatite;
(9) an alkenylsuccinic acid, alkenylsuccinate salt, and mixtures thereof to float scheelite;
(10) a sarcoside to float apatite and other phosphate ores;
(11) a vegetable oil, such as rice bran oil, to float apatite and other phosphate ores; and/or
(12) an alkyl hydroxamate to float oxide, hydroxide, and phosphate minerals like aeschynite, anatase, bindheimite, bixbyite, brookite, chrysoberyl, columbite, corundum, cuprite, euxenite, fergusonite, hausmannite, hematite, ilmenite, perovskite, periclase, polycrase, pseudobrookite, pyrochlore, betafite, microlite, ramsdellite, romanechite, cassiterite, plattnerite, pyrolusite, rutile, stishovite, samarskite, senarmontite, chromite, franklinite, magnesiochromite, magnetite, spinel, taaffeite, tantalite, tapiolite, uraninite, valentinite, zincite, brucite, gibbsite, goethite, limonite, manganite, psilomelane, romeite, stetefeldtite, carnotite, tyuyamunite, meta-autunite, autunite, apatite, phosphuranylite, tobernite, rhabdophane, triphylite, woodhouseite, brazilianite, chirchite, lithiophilite, hinsdalite, svanbergite, arthurite, cacoxenite, tsumebite, variscite, hopeite, meta-ankoleite, schoizite, strengite, whitlockite, xenotime, amblygonite, kidwellite, laueite, meta-uranocircite, meta-variscite, montebrasite, pseudomalachite, rockbridgeite, strunzite, tarbuttite, whiteite, anapaite, augelite, beraunite, chalcosiderite, collinsite, uranocircite, zeunerite, boltwoodite, uranophane, meta-torbernite, meta-uranocircite, walpurgite, zippeite, uranopilite, coconinoite, monazite, Stibiconite, quetzalcoaltlite, zincite, hodgkinsonite, aurichalcite, hydrozincite, rosasite, descloizite, Hopeite, veszelyite, ktenasite, and gahnite.

Also provided are mineral slurries that include an ore comprising a mineral of interest; a collector composition comprising a refined tall oil (e.g., a collector composition described above); and a liquid (e.g., water). The mineral of interest can be, for example, iron, phosphate, barite, fluorite, feldspar, potash, fluorspar, magnesite, scheelite, celestite, anglesite, alunite, bauxite, kainite, biotite, calcite, dolomite, albite, orthoclase, microcline, gypsum, anhydrite, columbite, tantalite, pyrochlore, apatite, cassiterite, wolframite, rutile, ilmenite, hematite, or kaolin; noble metals, such as comprises ruthenium, rhodium, palladium, silver, osmium, iridium, platinum, gold, mercury, rhenium and copper; refractory metals, such as niobium, molybdenum, tantalum, tungsten and rhenium, titanium, vanadium, chromium, zirconium, hafnium, osmium and iridium; rare earth metals, such as cerium, dysprosium, erbium, europium, gadolinium, holmium, lanthanum, lutetium, neodymium, praseodymium, promethium, samarium, scandium, terbium, thulium, ytterbium and yttrium; and mixtures thereof. In some cases, the mineral of interest is phosphate. In some cases, the mineral of interest is potash. In some cases, the mineral slurry can comprise from 30% to 80% by weight solids.

The collector compositions described herein may be packaged as articles of manufacture (e.g., kits) containing packaging material, a collector composition as provided herein within the packaging material, and a label that indicates that the collector composition is useful for froth flotation. Optionally, the kits can further include a frothing agent, a depressant, an additional collector, an activator, a modifier, or a combination thereof within the packaging material.

In some aspects, the refined tall oil may be used as a binder in methods used in mining applications. For instance, the refined tall oil described herein may be used in heap leaching methods to recover metals from ores including but not limited to from low grade ores. Heap leaching may be applied in copper leaching, for example, where the ore is stacked in heaps on a heap leach pad, and an acidic solution is applied to the heaps. As the leach solution percolates through the heap, the metal is solubilized and retained in the leach solution, typically known as a pregnant leach solution (PLS). The PLS is recovered in a collection pond, and then the metal is recovered from the PLS by causing the metal to leave the PLS. Metals may be recovered from the PLS with a number of techniques, including, but not limited to, precipitation and electrowinning.

In addition to pulling solubilized minerals through the heap, the percolating leach solution also causes migration of fine ore particles (fines). The migration of fines may clog the natural flow channels through the heap by forming impermeable barrier layers within the heap. These layers may prevent the leach solution from the reaching the underlying sections of the heaps. To overcome the problem of fines migration, the ore may be agglomerated prior to heap leaching. To form the agglomerates, the ores or the fines may be mixed with acid solution and the refined tall oil binder. By adding the refined tall oil binder alone or with the acid solution to the ores, high-quality agglomerates may be formed which have suitable water content and high permeability to fluid flow through a packed heap of agglomerates.

The refined tall oil binder may additionally comprise modifiers, including but not limited to, binders, including but not limited to lignin, cellulose, tall oil, polymers, and sodium silicate; fibers, and thickeners, including, but not limited to, cellulose-based thickeners such as carboxymethylcellulose, carboxyethylcellulose, and salts thereof.

The acid solution may comprise at least one of sulfuric acid, hydrochloric acid, nitric acid, among other acids suitable for the present disclosure.

ADDITIONAL DISCLOSURE

The following enumerated aspects of the present disclosures are provided as non-limiting examples.

A first aspect which is a collector composition comprising (a) refined tall oil wherein the refined tall oil is any tall oil that has been subjected to one or more refining or processing steps that results in an increase in acid value; and (b) a fatty acid wherein the refined tall oil has an acid value of at least 90 mg KOH/g and a weight average molecular weight of at least 750 g/mol.

A second aspect which is the composition of the first aspect wherein the refined tall oil comprises an ester content of less than 30% by weight, based on the weight of the refined tall oil.

A third aspect which is the composition of any of the first through second aspects wherein the refined tall oil comprises an ester content of less than 15% by weight, based on the weight of the refined tall oil.

A fourth aspect which is the composition of any of the first through third aspects wherein the refined tall oil comprises a polymeric acid content of at least 20% by weight, based on the weight of the refined tall oil.

A fifth aspect which is the composition of any of the first through fourth aspects wherein the refined tall oil comprises a polymeric acid content of at least 40% by weight, based on the weight of the refined tall oil.

A sixth aspect which is the composition of any of the first through fifth aspects wherein the refined tall oil has an acid value of at least 110 mg KOH/g.

A seventh aspect which is the composition of any of the first through sixth aspects wherein the refined tall oil has an acid value of at least 120 mg KOH/g.

An eighth aspect which is the composition of any of the first through seventh aspects wherein the refined tall oil has a weight average molecular weight of from 750 g/mol to 1300 g/mol.

A ninth aspect which is the composition of any of the first through eighth aspects wherein the refined tall oil comprises at least 40% by weight fatty acids, rosin acids, and fatty acid esters, based on the weight of the refined tall oil.

A tenth aspect which is the composition of any of the first through ninth aspects wherein the refined tall oil comprises at least 4.5% by weight linoleic acid and at least 7.5% by weight oleic acid, based on the weight of the refined tall oil.

An eleventh aspect which is the composition of any of the first through tenth aspects wherein the refined tall oil is present in an amount ranging from 5% to 90% by weight, based on the total weight of the composition.

A twelfth aspect which is the composition of any of the first through eleventh aspects wherein the fatty acid comprises a tall oil fatty acid.

A thirteenth aspect which is the composition of any of the first through twelfth aspects wherein the fatty acid is present in an amount ranging from 20% to 90% by weight, based on the total weight of the composition.

A fourteenth aspect which is the composition of any of the first through thirteenth aspects wherein the composition further comprises a frothing agent.

A fifteenth aspect which is the composition of any of the first through fourteenth aspects wherein the composition further comprises a depressant.

A sixteenth aspect which is a collector composition comprising (a) a refined tall oil; and (b) a fatty acid wherein the refined tall oil comprises an ester content of less than 30% by weight, based upon the weight of the refined tall oil; and wherein the refined tall oil comprises a polymeric acid content of at least 20% by weight, based upon the weight of the refined tall oil.

A seventeenth aspect which is the composition of the sixteenth aspect wherein the refined tall oil comprises an ester content of less than 15% by weight, based on the weight of the refined tall oil.

An eighteenth aspect which is the composition of any of the sixteenth through seventeenth aspects wherein the refined tall oil comprises a polymeric acid content of at least 40% by weight, based on the weight of the refined tall oil.

A nineteenth aspect which is the composition of any of the sixteenth through eighteenth aspects wherein the refined tall oil has an acid value of at least 90 mg KOH/g.

A twentieth aspect which is the composition of any of the sixteenth through nineteenth aspects wherein the refined tall oil has an acid value of at least 110 mg KOH/g.

A twenty-first aspect which the composition of any of the sixteenth through twentieth aspects wherein the refined tall oil has an acid value of at least 120 mg KOH/g.

A twenty-second aspect which is the composition of any of the sixteenth through twenty-first aspects wherein the refined tall oil has a weight average molecular weight of at least 750 g/mol.

A twenty-third aspect which is the composition of any of the sixteenth through twenty-second aspects wherein the refined tall oil has a weight average molecular weight of from 750 g/mol to 1300 g/mol.

A twenty-fourth aspect which is the composition of any of the sixteenth through twenty-third aspects wherein the refined tall oil comprises at least 40% by weight fatty acids, rosin acids, and fatty acid esters, based on the weight of the refined tall oil.

A twenty-fifth aspect which is the composition of any of the sixteenth through twenty-fourth aspects wherein the refined tall oil is present in an amount ranging from 5% to 90% by weight, based on the total weight of the composition.

A twenty-sixth aspect which is the composition of any of the sixteenth through twenty-fifth aspects wherein the fatty acid comprises a tall oil fatty acid.

A twenty-seventh aspect which is the composition of any of the sixteenth through twenty-sixth aspects wherein the fatty acid is present in an amount ranging from 20% to 90% by weight, based on the total weight of the composition.

A twenty-eighth aspect which is the composition of any of the sixteenth through twenty-seventh aspects wherein the composition further comprises a frothing agent.

A twenty-ninth aspect which is the composition of any of the sixteenth through twenty-eighth aspects wherein the composition further comprises a depressant.

A thirtieth aspect which is a mineral slurry comprising (a) an ore comprising a mineral of interest; (b) a collector composition of any of the preceding aspects; and (c) a liquid.

A thirty-first aspect which is the composition of the thirtieth aspect wherein the mineral slurry is from 20% to 80% by weight solids.

A thirty-second aspect which is the composition of any of the thirtieth through thirty-first aspects wherein the mineral of interest is chosen from iron, phosphate, barite, fluorite, feldspar, potash, fluorspar, magnesite, scheelite, celestite, anglesite, alunite, bauxite, gypsum, kainite, biotite, calcite, dolomite, albite, orthoclase, microcline, anhydrite, columbite, tantalite, pyrochlore, apatite, cassiterite, wolframite, rutile, ilmenite, hematite, and kaolin; noble metals, such as comprises ruthenium, rhodium, palladium, silver, osmium, iridium, platinum, gold, mercury, and copper; refractory metals, such as niobium, molybdenum, tantalum, tungsten and rhenium, titanium, vanadium, chromium, zirconium, hafnium, osmium and iridium; rare earth metals, such as cerium, dysprosium, erbium, europium, gadolinium, holmium, lanthanum, lutetium, neodymium, praseodymium, promethium, samarium, scandium, terbium, thulium, ytterbium and yttrium; and mixtures thereof.

A thirty-third aspect which is the composition of any of the thirtieth through thirty-first aspects wherein the mineral of interest is phosphate.

A thirty-fourth aspect which is the composition of any of the thirtieth through thirty first aspects wherein the mineral of interest is potash.

A thirty-fifth aspect which is a method for the beneficiation of an ore, the method comprising (a) providing a slurry comprising the ore dispersed in a liquid; (b) contacting the slurry with a collector composition comprising a refined tall oil; and (c) recovering a beneficiated ore.

A thirty-sixth aspect which is the method of the thirty-fifth aspect wherein the refined tall oil comprises an ester content of less than 30% by weight, based on the weight of the refined tall oil.

A thirty-seventh aspect which is the method of any of the thirty-fifth through thirty-sixth aspects wherein the refined tall oil comprises an ester content of less than 15% by weight, based on the weight of the refined tall oil.

A thirty-eighth aspect which is the method of any of the thirty-fifth through thirty-seventh aspects wherein the refined tall oil comprises a polymeric acid content of at least 20% by weight, based on the weight of the refined tall oil.

A thirty-ninth aspect which is the method of any of the thirty-fifth through thirty-eighth aspects, wherein the refined tall oil comprises a polymeric acid content of at least 40% by weight, based on the weight of the refined tall oil.

A fortieth aspect which is the method of any of the thirty-fifth through thirty-ninth aspects wherein the refined tall oil has an acid value of at least 90 mg KOH/g.

A forty-first aspect which is the method of any thirty-fifth through fortieth aspects wherein the refined tall oil has an acid value of at least 110 mg KOH/g.

A forty-second aspect which is the method of any of the thirty-fifth through forty-first aspects wherein the refined tall oil has an acid value of at least 120 mg KOH/g.

A forty-third aspect which is the method of any of the thirty-fifth through forty-second aspects wherein the refined tall oil has a weight average molecular weight of at least 750 g/mol.

A forty-fourth aspect which is the method of any of the thirty-fifth through forty-third aspects wherein the refined tall oil has a weight average molecular weight of from 900 g/mol to 1300 g/mol.

A forty-fifth aspect which is the method of any of the thirty-fifth through forty-fourth aspects wherein the refined tall oil comprises at least 40% by weight fatty acids, rosin acids, and fatty acid esters, based on the weight of the refined tall oil.

A forty-sixth aspect which is the method of any of the thirty-fifth through forty-fifth aspects wherein the refined tall oil comprises at least 4.5% by weight linoleic acid and at least 7.5% by weight oleic acid, based on the weight of the refined tall oil.

A forty-seventh aspect which is the method of any of the thirty-fifth through forty-sixth aspects wherein the refined tall oil is present in the collector composition in an amount ranging from 5% to 50% by weight, based on the total weight of the collector composition.

A forty-eighth aspect which is the method of any of the thirty-fifth through forty-seventh aspects wherein the collector composition further comprises a fatty acid.

A forty-ninth aspect which is the method of the forty-eighth aspect wherein the fatty acid comprises a tall oil fatty acid.

A fiftieth aspect which is the method of any of the forty-eighth through forty-ninth aspects wherein the fatty acid is present in an amount ranging from 20% to 60% by weight, based on the total weight of the collector composition.

A fifty-first aspect which is the method of any of the thirty-fifth through fiftieth aspects wherein the method further comprises contacting the slurry with a frothing agent.

A fifty-second aspect which is the method of any of the thirty-fifth through fifty-first aspects wherein the method further comprises contacting the slurry with a depressant.

A fifty-third aspect which is the method of any of the thirty-fifth through fifty-second aspects wherein the beneficiated ore comprises a mineral of interest chosen from iron, phosphate, barite, fluorite, feldspar, potash, fluorspar, magnesite, scheelite, celestite, anglesite, alunite, bauxite, gypsum, kainite, biotite, calcite, dolomite, albite, orthoclase, microcline, anhydrite, columbite, tantalite, pyrochlore, apatite, cassiterite, wolframite, rutile, ilmenite, hematite, and kaolin; noble metals, such as comprises ruthenium, rhodium, palladium, silver, osmium, iridium, platinum, gold, mercury, and copper; refractory metals, such as niobium, molybdenum, tantalum, tungsten and rhenium, titanium, vanadium, chromium, zirconium, hafnium, osmium and iridium; rare earth metals, such as cerium, dysprosium, erbium, europium, gadolinium, holmium, lanthanum, lutetium, neodymium, praseodymium, promethium, samarium, scandium, terbium, thulium, ytterbium and yttrium; and mixtures thereof.

A fifty-fourth aspect which is the method of the fifty-third aspect wherein the mineral of interest is phosphate.

A fifty-fifth aspect which is the method of the fifty-third aspect wherein the mineral of interest is potash.

A fifty-sixth aspect which is a composition for use in the beneficiation of an ore comprising a refined tall oil wherein the refined tall oil has an acid value of at least 90 mg KOH/g and an average molecular weight of at least 750 g/mol.

A fifty-seventh aspect which is a composition for use in the beneficiation of an ore comprising a refined tall oil wherein the refined tall oil comprises an ester content of less than 30% by weight, based upon the weight of the refined tall oil; and wherein the refined tall oil comprises a polymeric acid content of at least 20% by weight, based upon the weight of the refined tall oil.

A fifty-eighth aspect which is the composition of any of the fifty-sixth or fifty-seventh aspects further comprising a fatty acid.

A fifty-ninth aspect which is a collector composition comprising refined tall oil, wherein the refined tall oil has an acid value of at least 90 mg KOH/g and a weight average molecular weight of at least 750 g/mol.

A sixtieth aspect which is a collector composition comprising a refined tall oil, wherein the refined tall oil comprises an ester content of less than 30% by weight, based upon the weight of the refined tall oil; and wherein the refined tall oil comprises a polymeric acid content of at least 20% by weight, based upon the weight of the refined tall oil.

By way of non-limiting illustration, examples of certain aspects of the present disclosure are given below.

EXAMPLES

Acid value was determined using standard methods ASTM D 465-05 and AOCS Te 1 a-64. Standard test methods ASTM D 803-03 and AOCS Ja 10-87 (93) were used to measure Brookfield viscosity. Gardner-Holdt viscosity was determined using standard methods ASTM D1545-07 and AOCS Ja 11-87 (93). A hydrous acid number was obtained by titrating a sample of product dissolved in solvent (e.g., alcohol) using aqueous 0.5 N NaOH to a potentiometric endpoint (e.g., pH 13). All acid functionalities were titrated completely. The same ASTM test methodology as described above was used.

Example 1

Phosphate ore can be beneficiated using the Crago Double Flotation process, in which the ore is first subjected to flotation using an anionic collector, and then the improved ore is subjected to a second "Reverse Flotation" using a cationic collector that floats clay and allows the improved phosphate ore to sink. This example addresses the first "Positive Flotation" using an anionic collector. In particular the impact of consumption rate (collector dose) was investigated and the use standard tall oil pitch was compared to refined tall oil as beneficiation reagents in phosphate flotation.

The experiment was set up to evaluate two collector reagents containing a fatty acid paired with standard tall oil pitch and refined tall oil products in direct flotation of phosphate. The measured responses were selectivity and recovery of $P_2O_5$. Each collector blend contained 70% tall oil fatty acid and 30% standard tall oil pitch. Three levels were tested for collector dosage: 0.370, 0.625, and 0.750 g/kg-dry feed. The flotation step was carried out using a Metso D-12 flotation machine with variable frequency drive (VFD).

Samples were pre-bagged on a 1000 g dry-weight basis prior to flotation work. The conditioning step was carried out at 70% solids content (30% tap water). KOH (aq.) was used as the caustic modifier for a target pH of 9.0 at the end of the conditioning reaction. Conditioning time and agitation were held constant at 2 minutes and 875 rpm.

Immediately following the conditioning step, the conditioned ore was transferred to the flotation cell. The cell was filled with tap water to meet the required liquid height and solids content. Agitation (1300 rpm) was started with the air valve closed and allowed to pre-mix the slurry for 10 seconds. The air valve was then opened to allow the separation process to start. The phosphate froth is then continuously skimmed into the collection pan while simultaneously adding tap water, as needed, to maintain liquid height. The air valve was closed after two minutes of opening, the remaining material skimmed off, and the phosphate concentrate transferred to a sieve plate for rinsing. The concentrate, tailings, and feed were analyzed using acid digestion and ion-coupled plasma analysis to determine the phosphate concentration in each. The following formulas were used to determine the selectivity and recovery. Notations f, c, and t are the assays of the feed, concentrate, and tailings, respectively.

$$\text{Selectivity} = \frac{\text{wt \% } P_2O_5}{\text{wt \% Sample}}$$

$$\text{Recovery} = \left(\frac{c}{f}\right)\left(\frac{f-t}{c-t}\right) * 100$$

The results are presented in Table 1 and plotted in FIG. 3.

TABLE 1

| Reagent | | Dose (g) | Grade (% $P_2O_5$) | Recovery (% $P_2O_5$) | Average Grade (% $P_2O_5$) | Average Recovery (% $P_2O_5$) |
|---|---|---|---|---|---|---|
| Fatty acid/ Std Pitch Oil | 1A | 0.375 | 30.2 | 36.9 | 29.8 | 41.3 |
| | | 0.375 | 29.3 | 45.8 | | |
| | 1B | 0.625 | 24.3 | 84.4 | 24.8 | 89.2 |
| | | 0.625 | 25.3 | 93.9 | | |
| | 1C | 0.750 | 20.0 | 90.9 | 18.8 | 91.6 |
| | | 0.750 | 17.6 | 92.3 | | |
| Fatty acid/ Refined Tall Oik | 2A | 0.375 | 29.3 | 66.7 | 28.3 | 73.7 |
| | | 0.375 | 27.4 | 80.7 | | |
| | 2B | 0.625 | 22.8 | 96.2 | 19.6 | 96.3 |
| | | 0.625 | 16.4 | 96.3 | | |
| | 2C | 0.750 | 22.2 | 92.5 | 18.6 | 89.4 |
| | | 0.750 | 15.0 | 86.3 | | |

Each run condition was duplicated for DOE statistical modelling and assessed using the recovery/selectivity curve. Referring to Table 1, recovery, as measured in % phosphate, or % $P_2O_5$, measures the amount of pure material recovered. Average grade is the measurement of purity while average recovery is the measure for how much was recovered.

The standard tall oil pitch used in Samples 1A through 1C has fatty acids and rosin content of 10.4 weight percent based on the total weight of the composition; polymeric acid content of 22.8 weight percent based on the total weight of the composition; ester content of 53.3 weight percent based on the total weight of the composition (by difference); saponification value of 113 meq KOH/gm; and acid value of 51 meq KOH/gm. The refined tall oil used in Samples 2A through 2C has fatty acids and rosin content of 37 weight percent based on the total weight of the composition; polymeric acid content of 43 weight percent based on the total weight of the composition; ester content of 9.5 weight percent based on the total weight of the composition (by difference); saponification value of 145 meq KOH/gm; and acid value of 130 meq KOH/gm.

Samples 1A through 1C represent recovery when a standard tall oil pitch is used (and 2A through 2B represent recovery when the refined tall oil reagent is used). Referring to FIG. 1, the results demonstrate that when comparing 2A and 1A samples, the consumption of the reagent is the same, the average grade is similar but the recovery is much higher when 2A is used than when 1A is use. The results demonstrate that refined tall oil has a significant advantage over standard pitch oil for use in beneficiation. At lower and equal collector consumption rates, the use of refined tall oil in the collector formulation results in higher recovery at similar grade. This demonstrates lower consumption rate requirements for equal performance associated with the use of refined tall oil versus standard tall oil pitch.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps are disclosed herein are specifically described, other combinations of compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various aspects, the terms "consisting essentially of" and "consisting of" can be used in place of "comprising" and "including" to provide for more specific aspects of the disclosure and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed.

Unless defined otherwise, all technical and scientific terms used herein have the same meanings as commonly understood by one of skill in the art to which the disclosed disclosure belongs. Publications cited herein and the materials for which they are cited are specifically incorporated by reference.

What is claimed is:

1. A mineral slurry composition for the beneficiation of an ore in a floatation process, the composition comprising:
   an ore comprising a mineral of interest; and
   a collector composition comprising: (a) refined tall oil wherein the refined tall oil is any tall oil that has been subjected to one or more refining or processing steps that results in an increase in acid value; and (b) a fatty acid; wherein the refined tall oil has an acid value of at least 90 mg KOH/g and a weight average molecular weight of at least 750 g/mol; wherein the refined tall oil comprises an ester content of less than 15% by weight, based on the weight of the refined tall oil, and a polymeric acid content of at least 35% by weight, based on the weight of the refined tall oil; and
   wherein the collector composition is used to recover the minerals from mineral slurry by floatation at a recovery rate of at least 50%.

2. The composition of claim 1, wherein the refined tall oil has a weight average molecular weight of from 750 g/mol to 1300 g/mol.

3. The composition of claim 1, wherein the refined tall oil comprises at least 40% by weight fatty acids, rosin acids, and fatty acid esters, based on the weight of the refined tall oil.

4. The composition of claim 1, wherein the refined tall oil comprises at least 4.5% by weight linoleic acid and at least 7.5% by weight oleic acid, based on the weight of the refined tall oil.

5. The composition of claim 1, wherein the refined tall oil is present in an amount ranging from 5% to 90% by weight, based on the total weight of the composition.

6. The composition of claim 1, wherein the fatty acid comprises a tall oil fatty acid.

7. The composition of claim 1, wherein the fatty acid is present in an amount ranging from 20% to 90% by weight, based on the total weight of the composition.

8. The composition of claim 1, wherein the composition further comprises a frothing agent.

9. The composition of claim 1, wherein the composition further comprises a depressant.

10. A mineral slurry comprising:
    (a) an ore comprising a mineral of interest;
    (b) a collector composition comprising (i) a refined tall oil; and (ii) a fatty acid;
    (c) a liquid; and
    wherein the refined tall oil comprises an ester content of less than 15% by weight, based on the weight of the refined tall oil, a polymeric acid content of at least 35% by weight, based on the weight of the refined tall oil, wherein the refined tall oil has an acid value of at least 90 mg KOH/g and an average molecular weight of at least 750 g/mol, and wherein the collector composition facilitates recovery of the mineral from the mineral slurry for a recovery rate of the mineral of at least 50%.

11. The composition of claim 10, wherein the mineral slurry is from 20% to 80% by weight solids.

12. The composition of claim 10, wherein the mineral of interest is selected from the group consisting of iron, phosphate, barite, fluorite, feldspar, potash, fluorspar, magnesite, scheelite, celestite, anglesite, alunite, bauxite, gypsum, kainite, biotite, calcite, dolomite, albite, orthoclase, microcline, fluorspar, gypsum, anhydrite, columbite, tantalite, pyrochlore, apatite, cassiterite, wolframite, rutile, ilmenite, hematite, kaolin, noble metals, ruthenium, rhodium, palladium, silver, osmium, iridium, platinum, gold, mercury, rhenium, copper, refractory metals, niobium, molybdenum, tantalum, tungsten, rhenium, titanium, vanadium, chromium, zirconium, hafnium, osmium, iridium, rare earth metals, cerium, dysprosium, erbium, europium, gadolinium, holmium, lanthanum, lutetium, neodymium, praseodymium, promethium, samarium, scandium, terbium, thulium, ytterbium, yttrium; and combinations thereof.

13. A method for the beneficiation of an ore in a froth floatation process, the method comprising:

(a) providing a slurry comprising the ore dispersed in a liquid;

(b) contacting the slurry with a collector composition comprising a refined tall oil wherein the refined tall oil comprise an ester content of less than 15% by weight, based on the weight of the refined tall oil, a polymeric acid content of at least 35% by weight, based on the weight of the refined tall oil, and wherein the refined tall oil has an acid value of at least 90 mg KOH/g and an average molecular weight of at least 750 g/mol; and (c) recovering a beneficiated ore;

wherein the beneficiated ore is recovered at a rate of at least 50%.

14. The method of claim 13, wherein the refined tall oil is present in the collector composition in an amount ranging from 5% to 50% by weight, based on the total weight of the collector composition.

15. The method of claim 13, wherein the collector composition further comprises a fatty acid present in an amount ranging from 20% to 60% by weight, based on the total weight of the collector composition.

16. The mineral slurry of claim 10, wherein the collector composition is to facilitate recovery of the mineral from the mineral slurry in a direct flotation process or a reverse floatation process.

17. The collector composition of claim 1, wherein the polymeric acid is selected from the group of alkylated aromatics, dimerized fatty acids, trimerized fatty acids, dimerized aromatic acids.

* * * * *